US009507728B2

(12) United States Patent
Swaine et al.

(10) Patent No.: US 9,507,728 B2
(45) Date of Patent: Nov. 29, 2016

(54) BRIDGE CIRCUITRY FOR TRANSLATING BETWEEN MEMORY TRANSACTIONS OF FIRST TYPE AND MEMORY TRANSACTIONS OF A SECOND TYPE

(71) Applicant: ARM LIMITED, Cambridge (GB)

(72) Inventors: Andrew Brookfield Swaine, Cambridge (GB); Gareth Evans, Cambridge (GB); Matthew Lucien Evans, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/736,770

(22) Filed: Jun. 11, 2015

(65) Prior Publication Data

US 2016/0011985 A1  Jan. 14, 2016

(30) Foreign Application Priority Data

Jul. 8, 2014 (GB) .................................. 1412098.4

(51) Int. Cl.
*G06F 13/00* (2006.01)
*G06F 12/10* (2016.01)
*G06F 13/40* (2006.01)

(52) U.S. Cl.
CPC ......... *G06F 12/1009* (2013.01); *G06F 13/405* (2013.01); *G06F 2212/65* (2013.01)

(58) Field of Classification Search
CPC ........... G06F 12/1009; G06F 2212/65; G06F 13/405
See application file for complete search history.

(56) References Cited

U.S. PATENT DOCUMENTS

| 6,173,383 | B1 | 1/2001 | Casamatta |
| 6,425,071 | B1 | 7/2002 | Lo et al. |
| 7,334,073 | B2* | 2/2008 | Choi ..................... G06F 13/405 327/145 |
| 8,443,129 | B1* | 5/2013 | Murray ............... G06F 13/4221 710/307 |
| 2004/0024943 | A1 | 2/2004 | Lupien, Jr. et al. |

OTHER PUBLICATIONS

Search Report for GB 1412098.4, dated Jan. 14, 2015, 4 pages.

* cited by examiner

*Primary Examiner* — Tammara Peyton
(74) *Attorney, Agent, or Firm* — Nixon & Vanderhye P.C.

(57) ABSTRACT

A data processing apparatus 2 includes bridge circuitry 14, 16, 18 which serves to translate memory transactions of a first type (AXI) into memory transactions of a second type (PCI Express). The bridge circuitry includes translation circuitry 18 which maps at least some of the bits of attribute data of a memory transaction of the first type to unused bits within the significant bits of an address of the second type, which are unused to represent significant bits of the address of memory transactions of the first type.

22 Claims, 4 Drawing Sheets

Figure 1:
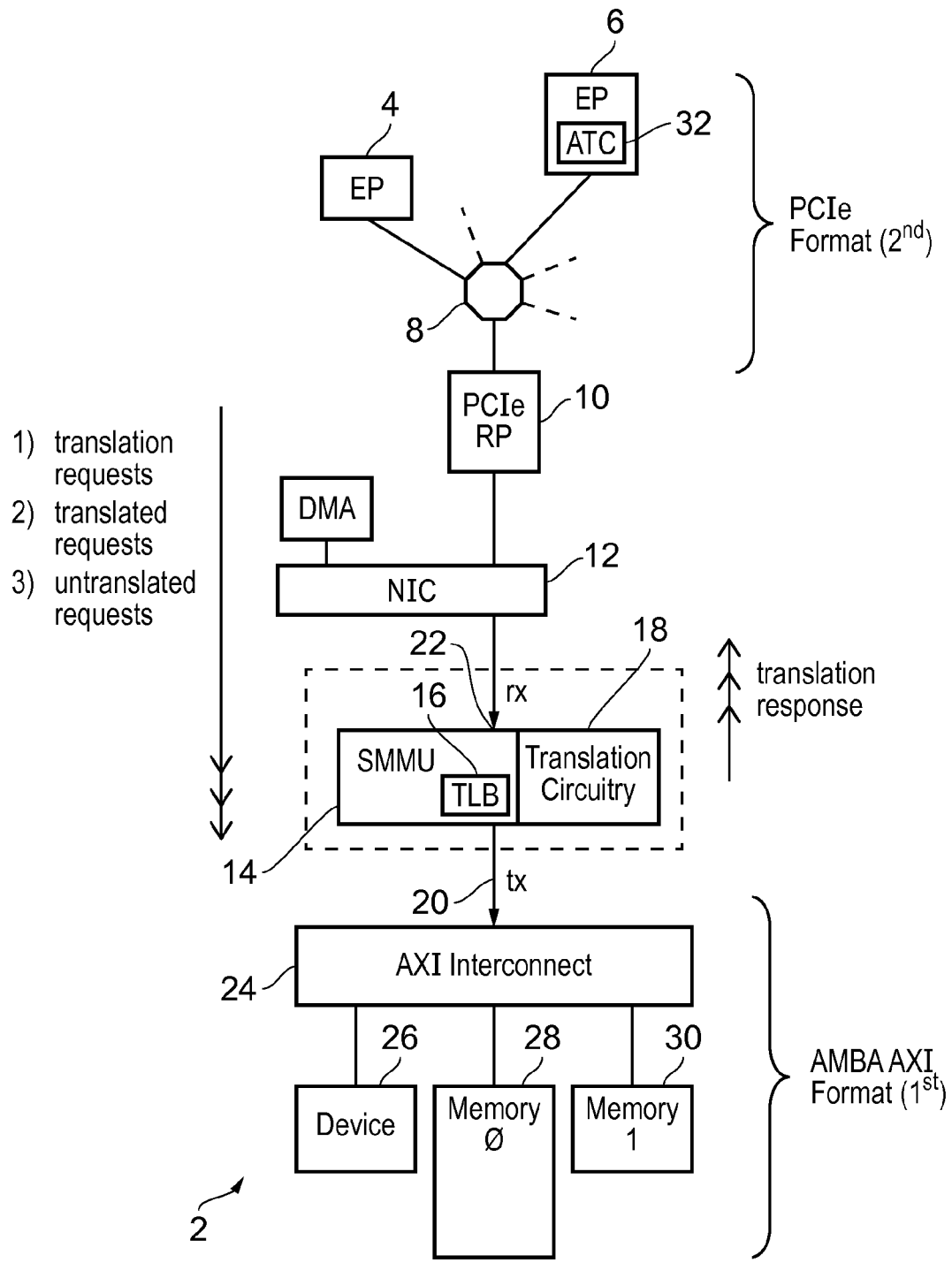

BRIDGE CIRCUITRY FOR TRANSLATING BETWEEN MEMORY TRANSACTIONS OF FIRST TYPE AND MEMORY TRANSACTIONS OF A SECOND TYPE

This application claims priority to GB Patent Application No. 1412098.4 filed 8 Jul. 2014, the entire contents of which is hereby incorporated by reference.

BACKGROUND

1. Field

This disclosure relates to the field of data processing systems. More particularly, this disclosure relates to the field of the translation between memory transactions of a first type and memory transactions of a second type within a data processing system.

2. Description

It is known to provide data processing systems in which memory transactions are routed across an interconnect between masters and slaves. Within such systems it is known to provide a system memory management unit which is able to translate memory transactions addresses, and associate programmable memory attribute data, for memory transactions passing across the interconnect circuitry. Such a system memory management unit may read page table data stored within the memory address space in order to control the translations made and the attributes applied. As such page table data can be slow to access, it is known to provide a translation lookaside buffer, or buffers, within system memory management units for caching translation data and attribute data in order to improve the speed of operation.

One issue with such an approach is that as the number of transaction sources and transaction destinations increases and the volume of transactions increases, the translation lookaside buffer(s) may be too small. One way of addressing this problem is to provide local translation lookaside buffers (or address translation caches) within the bus masters associated with the system such that these may perform their own address translations without requiring address translations to be supported by the system memory management unit, and the finite resources of the translation lookaside buffer of the system memory management unit.

It is also known to provide data processing systems which include bridge circuitry serving to bridge between memory transactions of a first type and memory transactions of a second type. For example, one side of the bridge circuit may utilise memory transactions in accordance with the PCI Express format and the other side of the bridge circuit may utilise memory transactions in accordance with the AMBA AXI transaction format. A problem that can arise in translating between memory transactions of a first type and memory transactions of a second type is that attribute data associated with memory transactions of a first type may not be supported, and have no counter part within, memory transactions of the second type. Accordingly, if a bus master issuing memory transactions of the second type wishes these to be translated into memory transactions of the first type without calling upon the system memory management unit to look up the memory attributes for the memory transaction of the first type, then the memory transaction of the second type has a difficulty that it has no conventional way of indicating attributes to be used when the translation is made into a memory transaction of the first type. One way of dealing with this would be to apply a default set of attributes when such a translation is made, but this lacks flexibility and is unable to deal effectively with all the desired different types of memory transaction that it may be wished to pass through the bridge circuitry.

SUMMARY

At least some example embodiments of the disclosure provide apparatus for processing data comprising:

bridge circuitry having a first port configured to transmit memory transactions of a first type, a second port configured to receive memory transactions of a second type and translation circuitry configured to translate between memory transactions of said first type and memory transactions of said second type; wherein said memory transactions of said first type specify X significant bits of address and A bits of attribute data, where X and A are both positive integer values;

said memory transactions of said second type specify Y significant bits of address, where Y is a positive integer value and Y is greater than X; and said translation circuitry is configured to map at least some of said A bits of attribute data of a memory transaction of said first type to unused bits within said Y significant bit of address of a second type unused to represent said X significant bits of address of said memory transaction of said first type.

At least some further example embodiments of the disclosure provide apparatus for processing data comprising:

bridge means for bridging between transaction types, said bridge means having first port means for transmitting memory transactions of a first type, second port means for receiving memory transactions of a second type and translation means for translating between memory transactions of said first type and memory transactions of said second type; wherein said memory transactions of said first type specify X significant bits of address and A bits of attribute data, where X and A are both positive integer values;

said memory transactions of said second type specify Y significant bits of address, where Y is a positive integer value and Y is greater than X; and said translation means maps at least some of said A bits of attribute data of a memory transaction of said first type to unused bits within said Y significant bit of address of a second type unused to represent said X significant bits of address of said memory transaction of said first type.

At least some further example embodiments of the disclosure provide a method of processing data comprising the steps of:

transmitting memory transactions of a first type at a first port of bridge circuitry;

receiving memory transactions of a second type at a second port of said bridge circuitry; and translating between memory transactions of said first type and memory transactions of said second type; wherein said memory transactions of said first type specify X significant bits of address and A bits of attribute data, where X and A are both positive integer values;

said memory transactions of said second type specify Y significant bits of address, where Y is a positive integer value and Y is greater than X; and said translating step maps at least some of said A bits of attribute data of a memory transaction of said first type to unused bits within said Y significant bit of address of a second type unused to represent said X significant bits of address of said memory transaction of said first type.

The above, and other objects, features and advantages of this disclosure will be apparent from the following detailed description of illustrative embodiments which is to be read in connection with the accompanying drawings.

DRAWINGS

Figure 2:
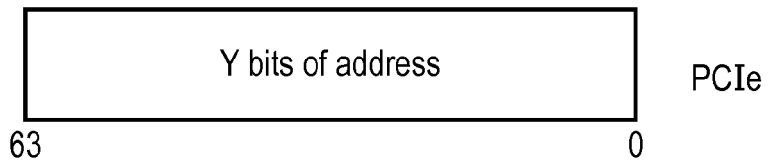
Figure 3:
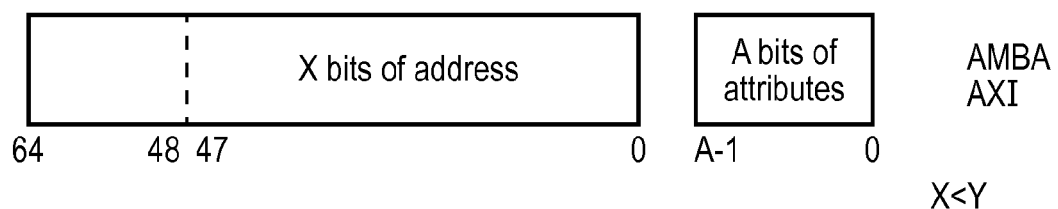
Figure 4:
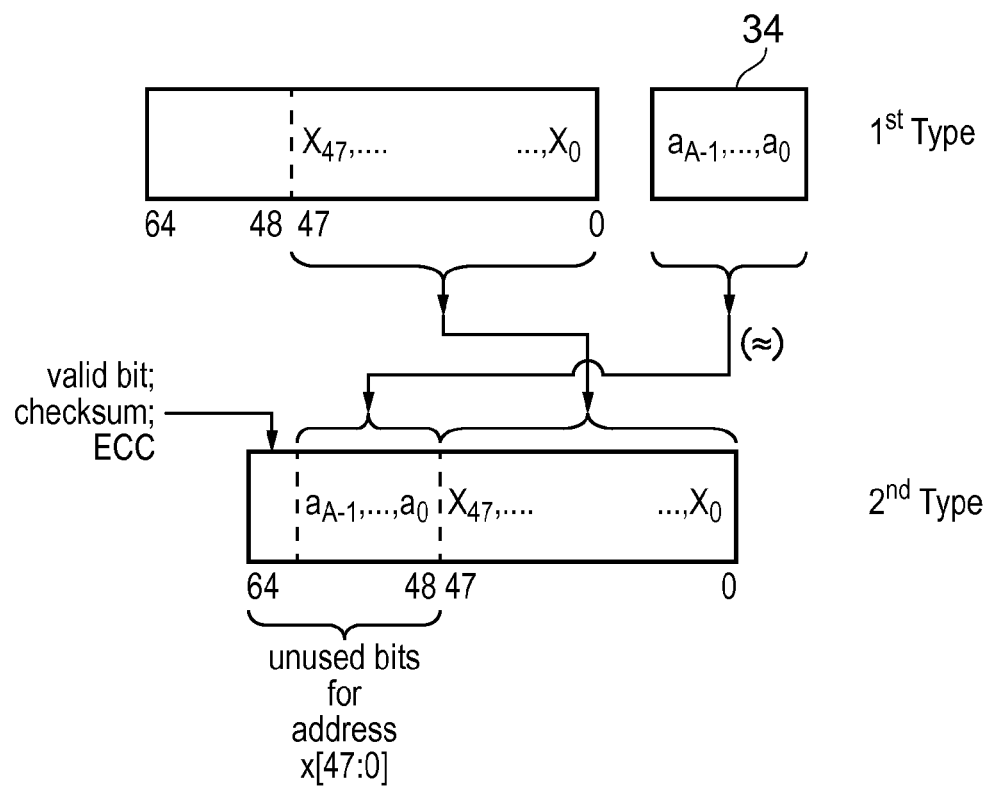
Figure 5:
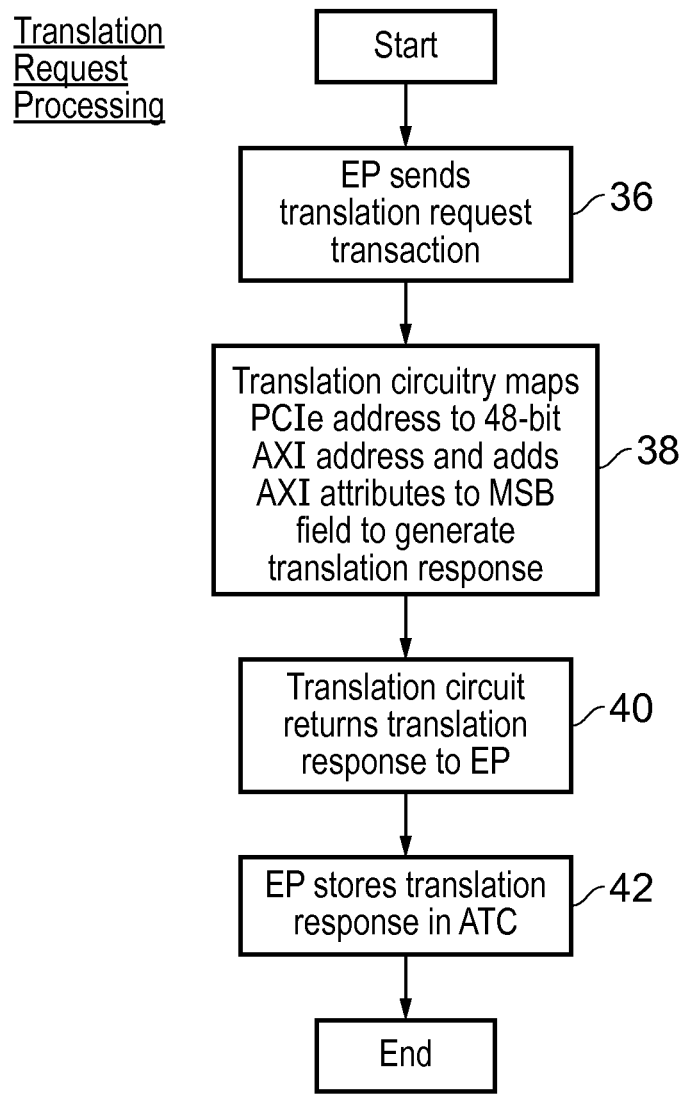
Figure 6:
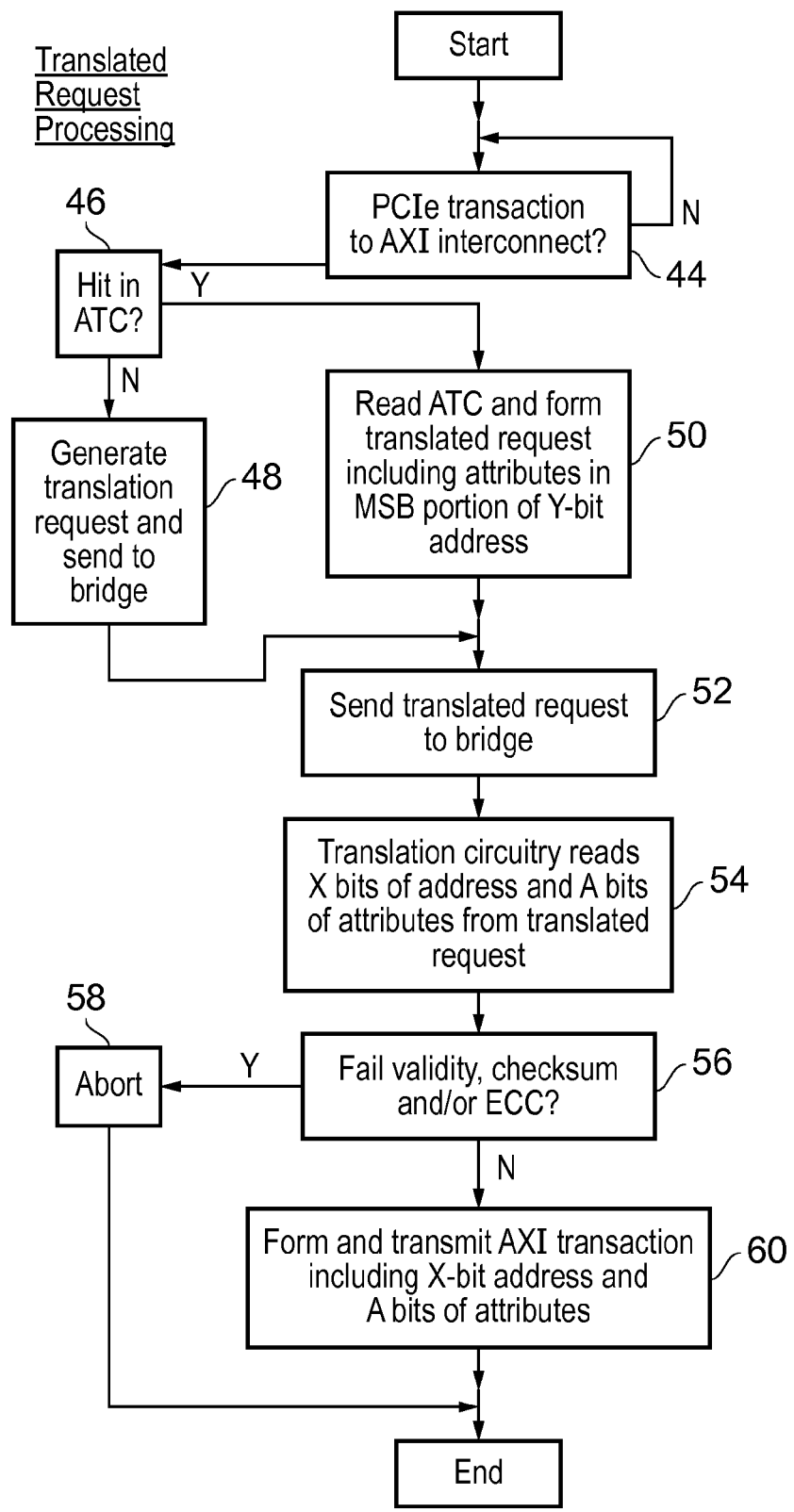

FIG. 1 schematically illustrates a data processing apparatus using memory transactions of a first type and memory transactions of a second type;

FIG. 2 schematically illustrates memory transactions of a second type;

FIG. 3 schematically illustrates memory transactions of a first type;

FIG. 4 schematically illustrates translation between memory transactions of a first type and memory transactions of a second type;

FIG. 5 is a flow diagram schematically illustrating translation request processing; and FIG. 6 is a flow diagram schematically illustrating translated request processing.

EMBODIMENTS

The present technique recognises that there are situations in which the memory transactions of a second type specify the memory address using a larger number of bits than is required to specify the memory address for the memory transactions of the first type. Accordingly, those bits of the address of the memory transactions of the second type which are not needed to specify bits of the address of the memory address of the first type can instead be used to carry/encode attribute data required for a translation between a memory transaction of the second type and a memory transaction of the first type. Thus, the attribute data of memory transactions of the first type may be encoded within unused bit space within the larger address bit space of memory transactions of the second type.

In some embodiments, a transaction source coupled to the second port may generate a translation request transaction of the second type which is sent to the translation circuitry. The translation circuitry can then return a translation response of the second type to the transaction source. Such a translation request may, in some embodiments, be pre-emptively generated when the transaction source predicts it will require a translation at a later time or may be generated when the transaction source seeks to generate a translated transaction, but then finds it does not have the necessary translation data to perform that translation.

The transaction source may include a translation cache configured to store the translation response. Locally storing the translation responses may enable more rapid translation to be achieved, produce a more scaleable system and potentially unburdens the system memory management unit in systems which include a system memory management unit.

The transaction source may serve to read the translation response stored within the translation cache and use this to perform its translation by generating a translated request transaction which includes the mapping of the attribute data which was returned in the translation response.

The translation circuitry within the bridge circuitry may serve to receive a translated request transaction and use the mapping of the attribute data to generate the attribute data which will form part of the memory transaction of the first type which is to be sent out from the first port by the bridge circuitry.

In some embodiments the translation circuitry may be configured to receive a translation request transaction and to generate the translation response such that it includes the mapping of at least some of the attribute data into some of the unused bits of the address of the memory transaction of the second type in which format the translation response is returned. The mapping of the attribute data into these unused bits may be transparent to the system using the memory transactions of the second type as it is the responsibility of the translation circuitry to extract and utilise this mapping of the attribute data to form the attributes when a memory transaction of the second type is to be translated into a memory transaction of the first type.

It will be appreciated that the attribute data could take a wide variety of different forms. Some or all of this attribute data may be mapped into the unused bit space of the addresses of the memory transactions of the second type. The mapping may be direct or indirect, such as using compressed forms and/or omitting certain types of attribute data which are not relevant to memory transactions of the second type. In some example embodiments, the attribute data may specify any of the information normally contained in translation page tables for memory of the first type other than the translated address, for example that a transaction of the first type is one of a device transaction directed to a memory map device, a non-cacheable transaction, a cacheable non-showable transaction, or a cacheable shareable transaction.

In some embodiments, although not in all, the bridge circuitry may include a translation lookaside buffer configured to store address translation data, including attribute data, for translating between memory transactions of the first type and memory transactions of the second type. The translation look aside buffer within the bridge circuitry itself is a finite resource and is more difficult to scale when extra transaction sources are added to a system.

In some embodiments, the bridge circuitry may include a system memory management unit and the address translation data may be derived from page tables (typically stored within the memory address space).

While it will be appreciated that present techniques may be used with memory transactions of a wide variety of different forms, some example forms in which the present technique may be used include those in which the memory transactions of the second type comprise memory transactions conforming to a PCI Express format.

In some embodiments, the memory transactions of the first type may comprise memory transactions conforming to a AMBA AXI format (e.g. such a format incorporating the AMBA Coherency Extensions).

While it will be appreciated that the unused bits may be located at various positions within the Y significant bits of the address of the second type, a usual position for these unused bits is a contiguous unused bit field extending from a most significant bit end of the Y significant bits of the address.

The translation circuitry may in some embodiments serve to set one or more bit positions within the unused bits of the translation response to predetermined values which can be used to validate whether or not a translated request subsequently received by the translation circuitry (and accordingly intended to use the translation response including the predetermined bit values) does or does not include those predetermined bit values. If these predetermined bit values are missing, then a mistranslation response may be triggered.

In other embodiments the translation circuitry may instead of, or in addition to including such validity bits also include a checksum value and/or an error correcting code for at least some of the memory transaction within the unused bits of the Y bits of the address of the second type.

FIG. 1 schematically illustrates a data processing apparatus 2 including a plurality of transaction sources 4, 6 in the form of PCI Express end point transaction masters coupled via a PCI Express tree network 8 to a PCT Express root point 10. The elements of the PCI Express network 4, 6, 8, 10 communicate using memory transactions of a second type, namely memory transactions conforming to a PCT Express format.

The PCT Express root point 10 is connected via a network interface controller (NIC) 12 to a system memory management unit 14. The system memory management unit 14 includes a translation lookaside buffer 16 and translation circuitry 18. The system memory management unit 14 includes a first port 20 from which memory transactions of a first type are transmitted and a second port 22 at which memory transactions of a second type are received. Connected to the first port 20 is an AXI interconnect 24, which in turn connects to a plurality of transaction slaves including a memory mapped device 26, a first memory 28 and a second memory 30. The portions of the data processing apparatus coupled to the first port 20 communicate using memory transactions of a first type, namely memory transactions with an AMBA AXI format.

The end point 6 includes a translation cache in the form of an address translation cache 32. This may be used to store address translation data so that the end point 6 can generate translated requests which the system memory management unit 14 can treat as having already been subject to an appropriate address translation. However, a problem arising due to the mismatch between the memory transactions of the PCI Express format and the memory transactions of the AMBA AXI format is that the memory transactions of the AMBA AXI format utilise attribute data is not accommodated (specifiable) within memory transactions of the PCI Express format. Accordingly, the translation data stored within the address translation cache 32 would not normally be able to represent the attribute data needed to generate appropriate translated memory transactions in accordance with the AMBA AXI format. The present techniques address this issue by providing the translation circuitry 18 which serves to return translation responses back to the end point 6 for caching within the address translation cache 32 which include within their most significant bit portion a mapping of the attribute data which may be used to form an appropriately translated memory transaction in accordance with the AMBA AXI format. It is possible for an AMBA AXI address to use 64 bits, but in many embodiments the AMBA AXI address width used may be less than 64 bits, which is less than the 64 bit addresses used by PCI Express. The PCI Express format uses addresses which may be wider than the addresses used by the AMBA AXI format. This difference in address width may be exploited as there will be unused bits within the wider PCI Express address which are not needed to represent the AMBA AXI address and accordingly these unused bits may be used to store the mapping of the attribute bits which are required by the AMBA AXI format. The PCI Express format may be considered to use Y significant bits of address, whereas the AMBA AXI format may be considered to use X significant bits of address, where Y is greater than X and both are positive integer values. The AMBA AXI format may be considered to use A bits of attribute data. Some or all of these bits of attribute data may be mapped directly, indirectly or in an encoded form into the unused bits within the most significant bit portion of the PCI Express address in which they are translated and which is stored within the address translation cache 32. The use of these most significant bits to represent attribute data may be transparent to the end point 6, as it merely receives a translated address, stores this translated address within its address translation cache 32 and then uses that translated address when it requires it. The translation circuitry 18 which originally added that mapping of the attribute data into the translation response (and which was stored within the address translation cache 32) is responsible for interpreting that attribute data when it is returned to it as part of a memory transaction of the second type and accordingly can use that mapping of the attribute data to reconstruct an appropriate memory transaction of the first type (namely an AMBA AXI memory transaction including the necessary A bits of attribute data).

At an overall level there are two types of translation performed: a protocol conversion from PCI Express to AMBA AXI; and an address space translation (virtual-to-physical). The normal PCI Express translation requests cater for the virtual-to-physical translation with the results stored in the address translation cache. In this example the translation is performed across a protocol boundary with attributes used I the protocol conversion stored within the upper bits of the translated physical address stored in the address translation cache.

FIG. 2 schematically illustrates the memory address portion of a memory transaction in accordance with the PCI Express format. This comprises Y bits of address, which in this example may be 64 bits.

FIG. 3 schematically illustrates a memory transaction in accordance with the AMBA AXI format. This memory transaction includes X significant bits of address. X is less than Y, and in this example X is 48. The most significant bit portion of a 64-bit address which may be passed by a bus supporting AMBA AXI memory transactions is unused. Accordingly, when the X bits of address of the AMBA AXI format memory transaction need to be represented within a PCI Express memory transaction, this will leave 16 bits of the 64-bit PCI Express address unused. These unused 16 bits may be used to store the A bits of attribute data which are illustrate in FIG. 3, and which accompany the AMBA AXI format transaction. These attribute bits may represent different types of memory transaction, such as the transaction being a device transaction directed to a memory mapped device (e.g. device 26), a non-cacheable transaction, a cacheable non-shareable transaction or a cacheable shareable transaction. Those familiar with this technical field will understand the significance of whether a transaction is cacheable or non-cacheable or whether a transaction is shareable or non-shareable in the context of a coherent memory system.

FIG. 4 schematically illustrates the conversion of a memory transaction of the first type into a memory transaction of the second type. The attribute bits 34 are mapped into the unused bits at the most significant bit end of the memory transaction of the second type. These unused bits comprise a contiguous bit field extending from the most significant bit end of the 64-bit memory address of the second type. The attribute bits may be mapped across on a one-to-one basis if there is sufficient space, or alternatively a subset of the attribute bits may be mapped across, or in other embodiments an encoding of the attribute bits may be mapped across.

The X bits of the address of the memory transaction of the first type are mapped into the corresponding positions within the least significant bit portion of the memory address of the second type as illustrated in FIG. 2. This is a one-to-one mapping. Also illustrated in FIG. 2, is that various additional data may be inserted into the unused bits of the Y bits of the address of the memory transaction of the second type. The additional information inserted may include, for example, a validity bit indicating that the attribute data encoded in the unused bits is valid, checksum data for some or all of the memory transaction and error correcting code data for some or all of the memory transaction(s). Those familiar with this technical field will be familiar with the use of checksums and error correcting codes to provide error checking and correction in respect of data values and/or blocks of data values being stored and transmitted.

FIG. 5 schematically illustrates translation request processing. At step 36 an end point 6 sends a translation request transaction (which may have a format matching that of the PCI Express Address Translation Services Format) to the bridge circuitry comprising the system memory management unit 14, the translation lookaside buffer 16, and the translation circuitry 18 of FIG. 1. At step 38 the translation circuitry 18 maps the PCI Express address to a 48-bit AXI address and adds the AXI attributes to the most significant bit field so as to generate a transaction response which is returned to the end point 6 at step 40. At step 42, the end point 6 stores the transaction response within the address translation cache 32. The translation response comprises the 48 bits specifying the actual address translation as well as the attribute data encoded in a most significant bit portion of the address response. This encoding of the attribute data into the most significant bit portion of the address response can be transparent to the end point 6.

A translation request may be pre-emptively generated by an end point 6 when it determines that it will require the translation data at some point in the future. Alternatively, a translation request may be generated when a miss arises 4 translation data within the address translation cache 32. In this case, a translation request may be generated, the translation response returned and then a translated request using that translation response generated.

FIG. 6 is a flow diagram schematically illustrating translated request processing. At step 44 processing waits until there is a PCI Express translation which requires translation 2 and an AXI transaction for issue upon the interconnect 24. When such a transaction arises, step 46 performs a look up in the address translation cache 32. If this look up at step 46 misses, then step 48 generates a translation request and sends this to the bridge circuitry including the translation circuitry 18 as discussed in relation to FIG. 5. The translation response is then used to generate a subsequent translation request as previously mentioned at step 52. If the determination at step 46 is that the address translation cache 32 does contain the necessary translation, then step 50 serves to read this translation data and form a translated request including attributes taken from the most significant bit portion of the translation data represented in the form of the Y bit address, but in fact comprising an upper portion of attribute data followed by X bits of address needed for the AMBA AXI memory transaction.

Step 52 sends the translated request to the bridge circuitry including the system memory management unit 14 the translation lookaside buffer 16 and the translation circuitry 18. At step 54 the translation circuitry 18 reads the Y bit address sent to it and interprets this as X bits of address from the least significant portion and attribute data for forming A bits of attribute data from the most significant bit portion of the received address.

Step 56 determines from a validity bit, checksum data and/or error correction code data whether or not any of these has failed, and if there is a failure triggers an abort at step 58. If there is no failure, then step 60 serves to form and transmit an AXI transaction including the X-bit address and the A bits of attribute data onto the AXI interconnect 24.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus for processing data comprising:
   bridge circuitry having a first port configured to transmit memory transactions of a first type, a second port configured to receive memory transactions of a second type and translation circuitry configured to translate between memory transactions of said first type and memory transactions of said second type; wherein
   said memory transactions of said first type specify X significant bits of address and A bits of attribute data, where X and A are both positive integer values;
   said memory transactions of said second type specify Y significant bits of address, where Y is a positive integer value and Y is greater than X; and
   said translation circuitry is configured to map at least some of said A bits of attribute data of a memory transaction of said first type to unused bits within said Y significant bit of address of a second type unused to represent said X significant bits of address of said memory transaction of said first type.

2. Apparatus as claimed in claim 1, comprising a transaction source coupled to said second port and configured:
   to generate a translation request transaction of said second type to be sent to said translation circuitry, and
   to receive a translation response of said second type from said translation circuitry.

3. Apparatus as claimed in claim 2, wherein said transaction source comprises a translation cache configured to store said translation response.

4. Apparatus as claimed in claim 3, wherein
   said transaction source is configured to read said translation response from said translation cache and to use said translation response to generate an translated request transaction of said second type to be sent to said translation circuitry, said translated request transaction including a mapping of said at least some of said A bits of attribute data within said unused bits of said Y significant bits of address of said translated request transaction.

5. Apparatus as claimed in claim 4, wherein said translation circuitry is configured to receive said translated request transaction via said second port and to use said mapping of said at least some of said A bits of attribute data to generate said at least some of said A bits of attribute data to form part of memory transaction of said first type to be sent from said first port.

6. Apparatus as claimed in claim 2, wherein said translation circuitry is configured to receive said translation request transaction and to generate said translation response including a mapping of said at least some of said A bits of attribute data within said unused bits of said Y significant bits of address of said translation response.

7. Apparatus as claimed in claim 6, wherein said translation request transactions is in accordance with a PCI Express Address Translation Services Format.

8. Apparatus as claimed in claim 1, wherein said attribute data specifies that said memory transaction of said first type is one of:
 a device transaction directed to a memory mapped device;
 a non-cacheable transaction;
 a cacheable, non-shareable transaction; and
 a cacheable, shareable transaction.

9. Apparatus as claimed in claim 1, wherein said bridge circuitry includes a translation lookaside buffer configured to store address translation data, including attribute data, translating between said memory transaction of said first type and said memory transactions of said second type.

10. Apparatus as claimed in claim 9, wherein said bridge circuitry includes a system memory management unit and said address translation data is derived from page tables.

11. Apparatus as claimed in claim 1, wherein said memory transactions of said second type comprise memory transactions conforming to a PCI Express format.

12. Apparatus as claimed in claim 11, wherein said bridge circuitry includes PCI Express root point circuitry.

13. Apparatus as claimed in claim 1, wherein said memory transactions of said first type comprise memory transactions conforming to an AMBA AXI format.

14. Apparatus as claimed in claim 12, comprising interconnect circuitry coupled to said first port and serving memory transactions conforming to said AMBA AXI format.

15. Apparatus as claimed in claim 1, wherein said unused bits comprise a contiguous unused bit field extend from a most significant bit end of said Y significant bits of address.

16. Apparatus as claimed in claim 4, wherein said translation circuitry is configured to receive said translation request transaction and to generate said translation response including a mapping of said at least some of said A bits of attribute data within said unused bits of said Y significant bits of address of said translation response and said translation circuitry is configured to set one or more predetermined bit positions within said unused bits of said translation response to predetermined bit values and, if said translated request transaction received by translation circuitry does not include said predetermined bit values at said one or more bit positions, then to trigger a mistranslation response.

17. Apparatus as claimed in claim 1, wherein said translation circuitry includes a checksum value for at least some of said memory transaction of said second type within said unused bits.

18. Apparatus as claimed in claim 1, wherein said translation circuitry includes an error correcting code for at least some of said memory transaction of said second type within said unused bits.

19. Apparatus as claimed in claim 1, wherein a fail safe set of said A bits of said attribute data is mapped to values of said unused bit of all zeros.

20. Apparatus for processing data comprising:
 bridge means for bridging between transaction types, said bridge means having first port means for transmitting memory transactions of a first type, second port means for receiving memory transactions of a second type and translation means for translating between memory transactions of said first type and memory transactions of said second type; wherein
 said memory transactions of said first type specify X significant bits of address and A bits of attribute data, where X and A are both positive integer values;
 said memory transactions of said second type specify Y significant bits of address, where Y is a positive integer value and Y is greater than X; and
 said translation means maps at least some of said A bits of attribute data of a memory transaction of said first type to unused bits within said Y significant bit of address of a second type unused to represent said X significant bits of address of said memory transaction of said first type.

21. A method of processing data comprising the steps of:
 transmitting memory transactions of a first type at a first port of bridge circuitry;
 receiving memory transactions of a second type at a second port of said bridge circuitry; and
 translating between memory transactions of said first type and memory transactions of said second type; wherein
 said memory transactions of said first type specify X significant bits of address and A bits of attribute data, where X and A are both positive integer values;
 said memory transactions of said second type specify Y significant bits of address, where Y is a positive integer value and Y is greater than X; and
 said translating step maps at least some of said A bits of attribute data of a memory translation of said first type to unused bits within said Y significant bit of address of a second type unused to represent said X significant bits of address of said memory transaction of said first type.

22. Translation circuitry configured to:
 translate between memory transactions of a first type and memory transactions of a second type; wherein
 said memory transactions of said first type specify X significant bits of address and A bits of attribute data, where X and A are both positive integer values;
 said memory transactions of said second type specify Y significant bits of address, where Y is a positive integer value and Y is greater than X; and
 said translation circuitry is configured to map at least some of said A bits of attribute data of a memory transaction of said first type to unused bits within said Y significant bit of address of a second type unused to represent said X significant bits of address of said memory transaction of said first type.

* * * * *